July 22, 1969 G. F. BUSHA ET AL 3,456,828
CONTAINER AND METHOD
Filed July 11, 1967 5 Sheets-Sheet 3
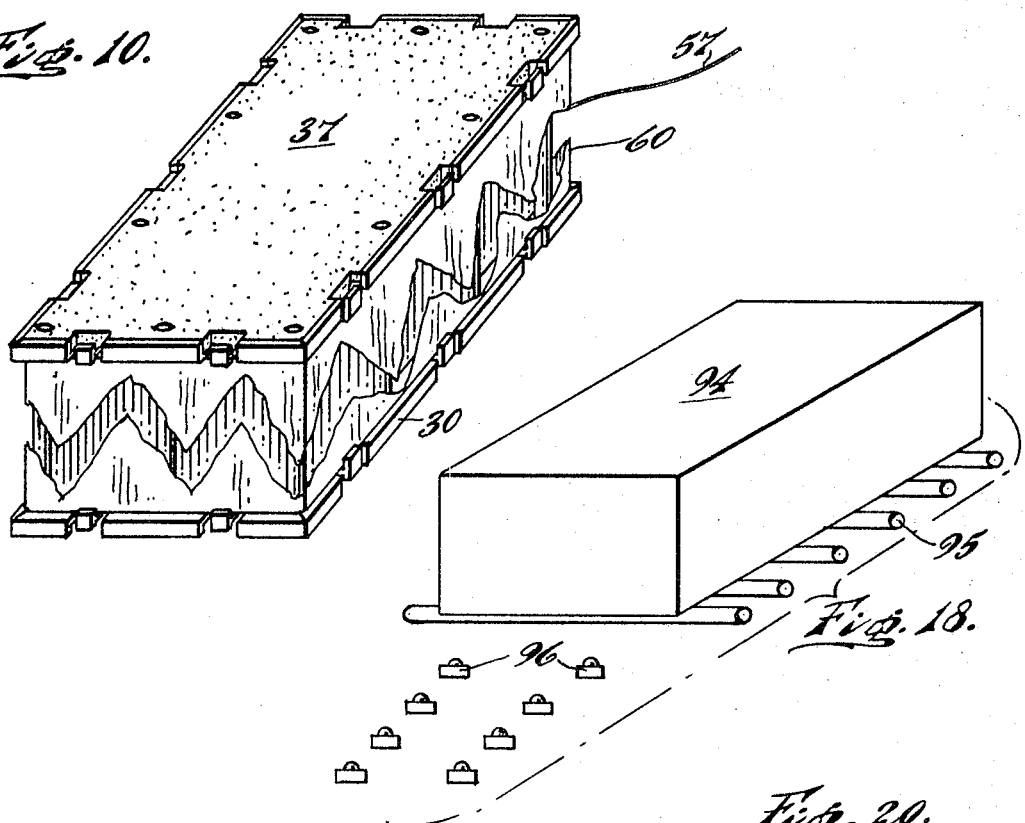
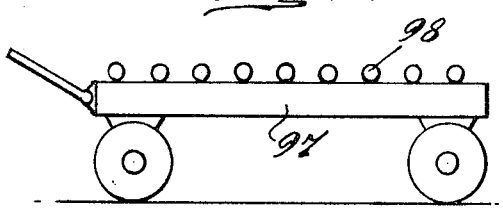
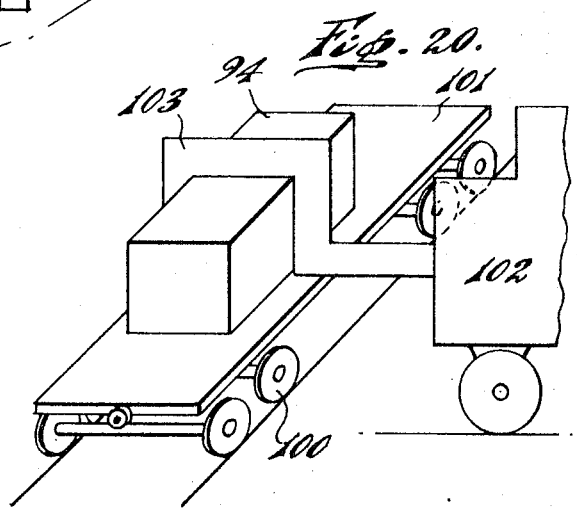
INVENTORS
George F. Busha
Richard S. Frees
BY
ATTORNEYS July 22, 1969  G. F. BUSHA ET AL  3,456,828
CONTAINER AND METHOD
Filed July 11, 1967  5 Sheets-Sheet 4
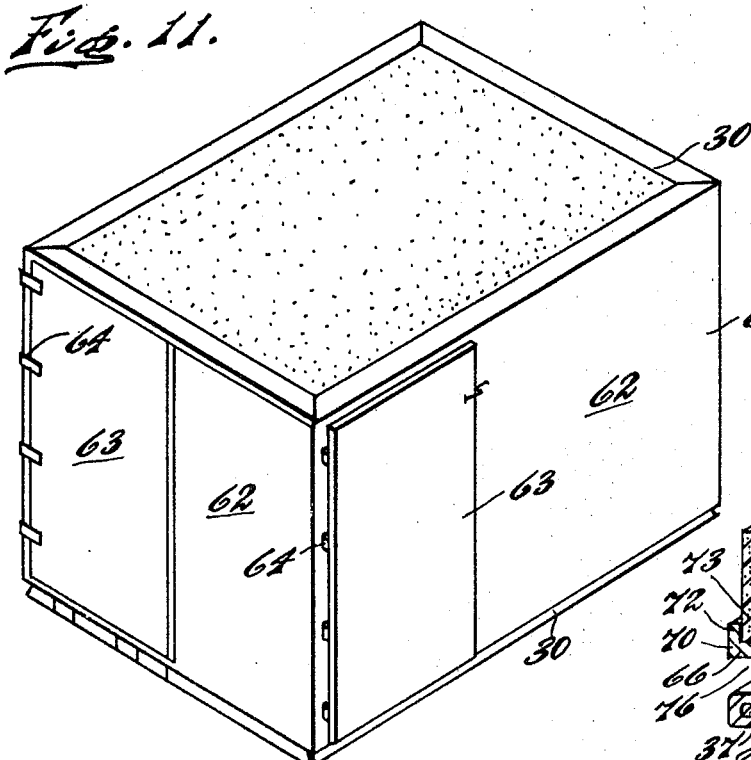
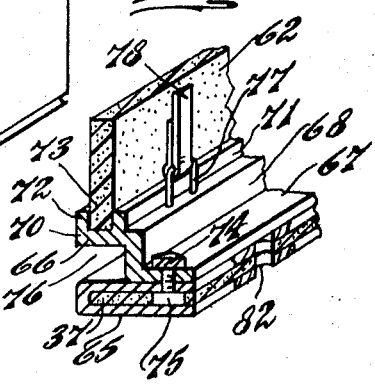
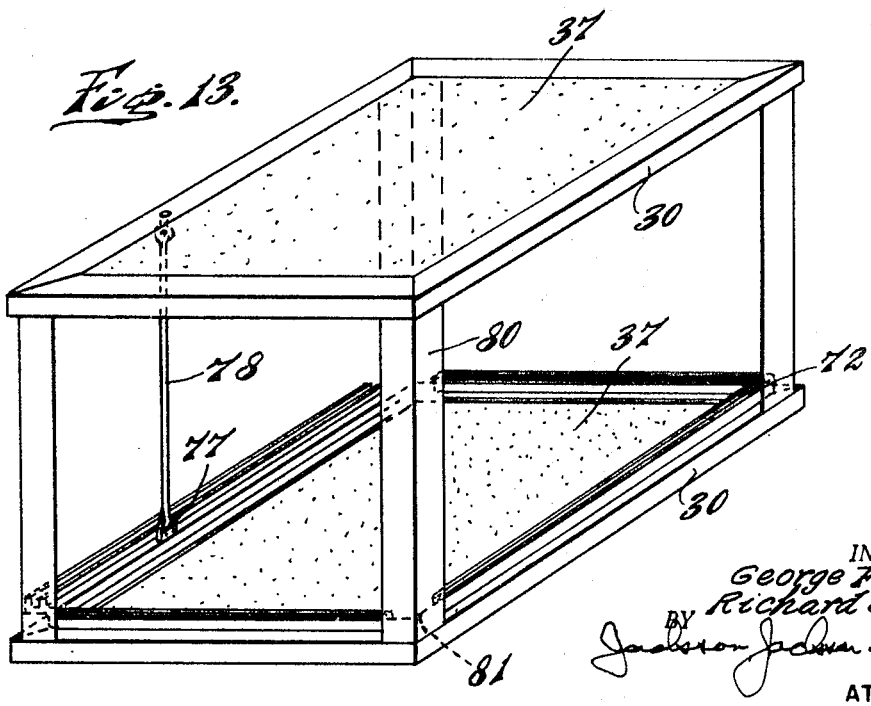
INVENTOR.
George F. Busha
Richard S. Frees
BY
ATTORNEYS July 22, 1969  G. F. BUSHA ET AL  3,456,828
CONTAINER AND METHOD
Filed July 11, 1967  5 Sheets-Sheet 5
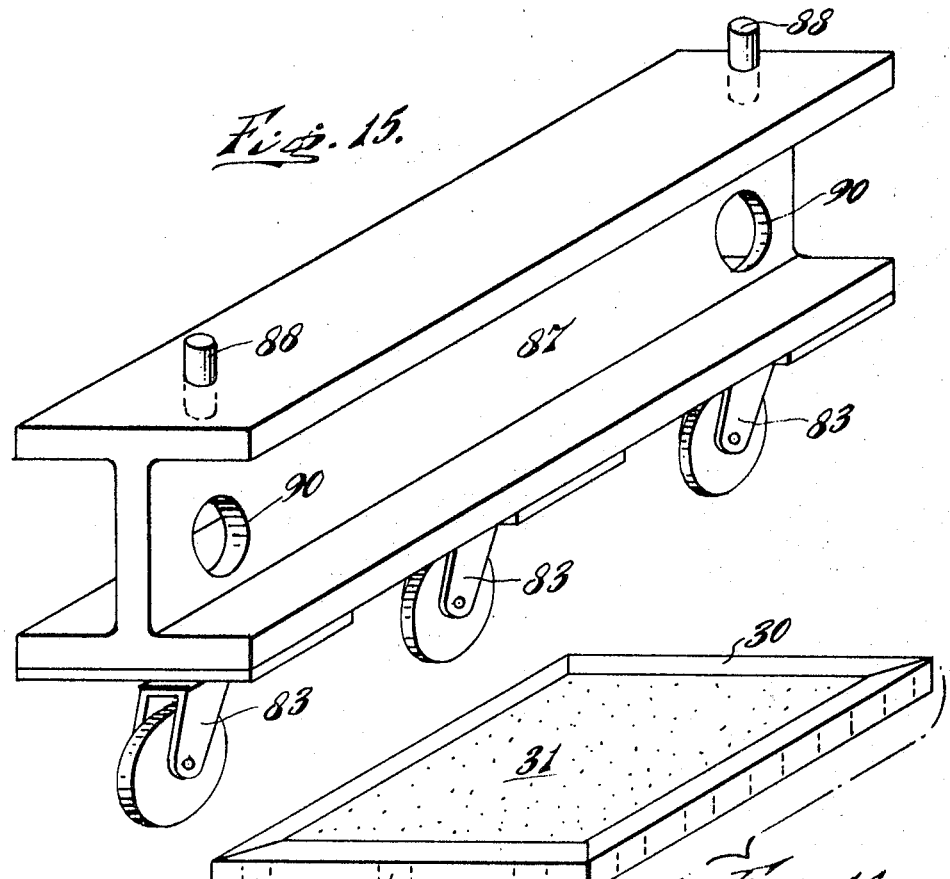
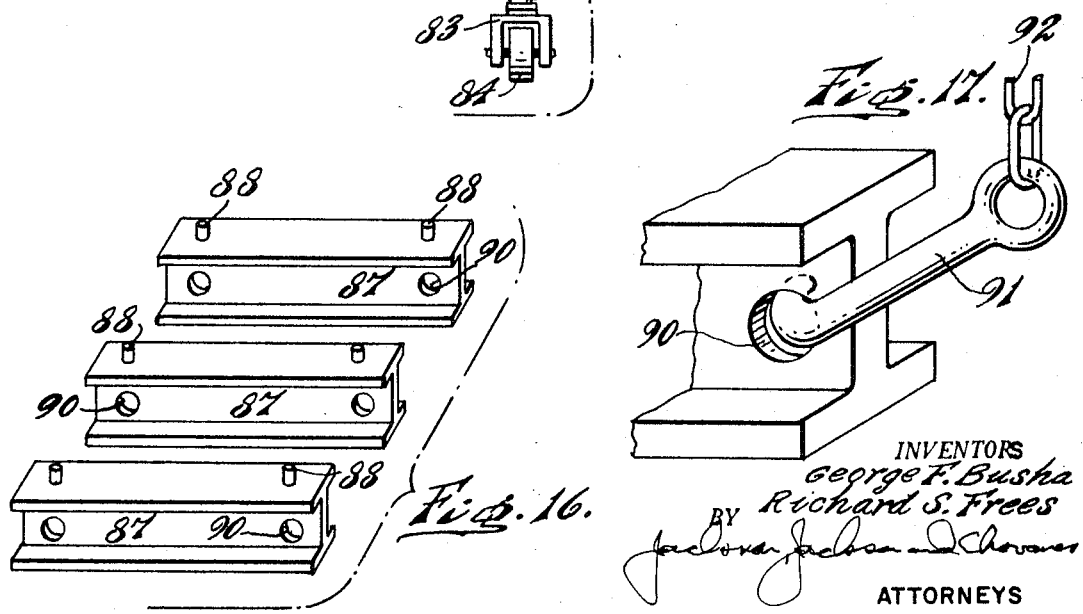
INVENTORS
George F. Busha
Richard S. Frees
BY
ATTORNEYS United States Patent Office 3,456,828
Patented July 22, 1969

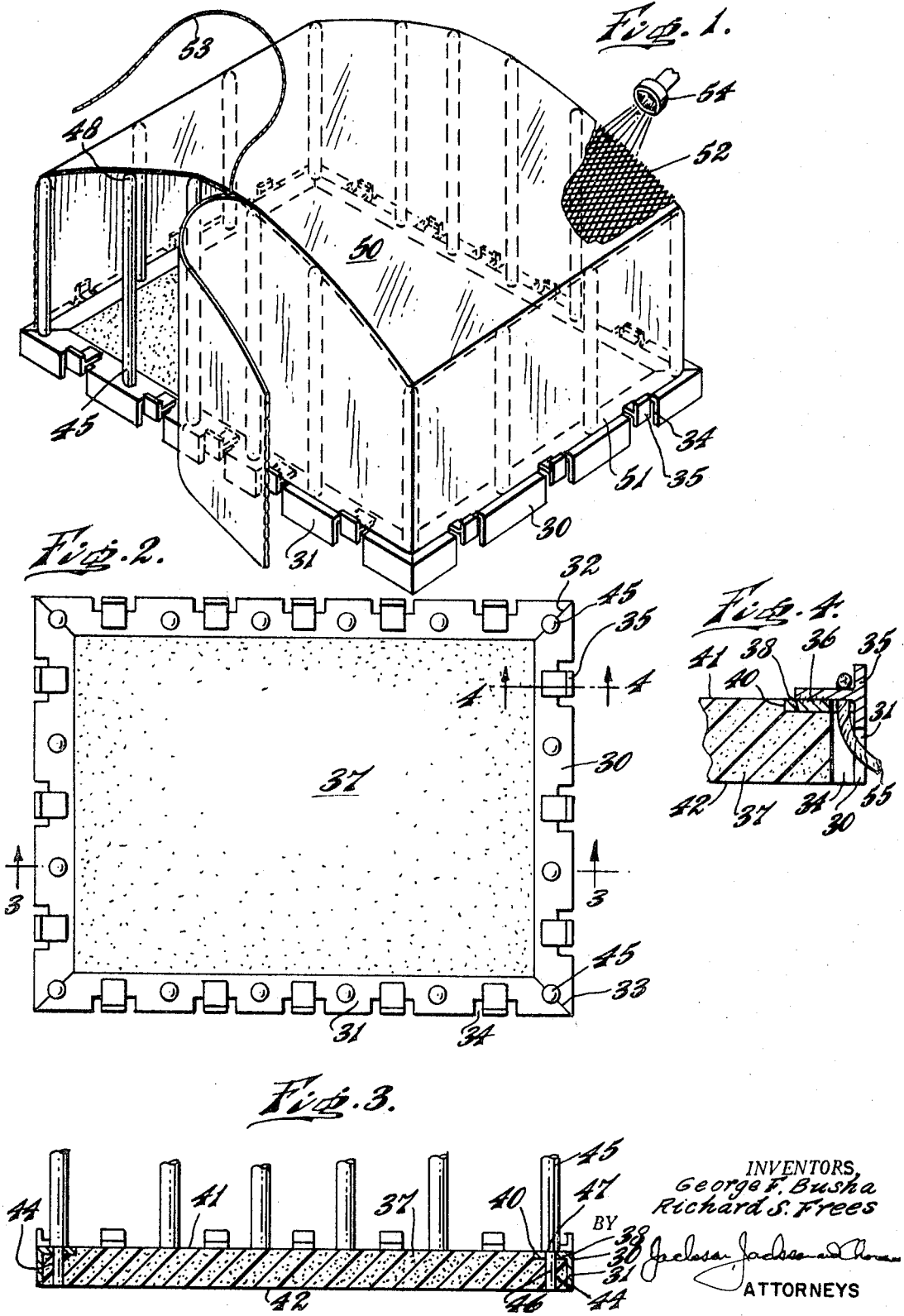

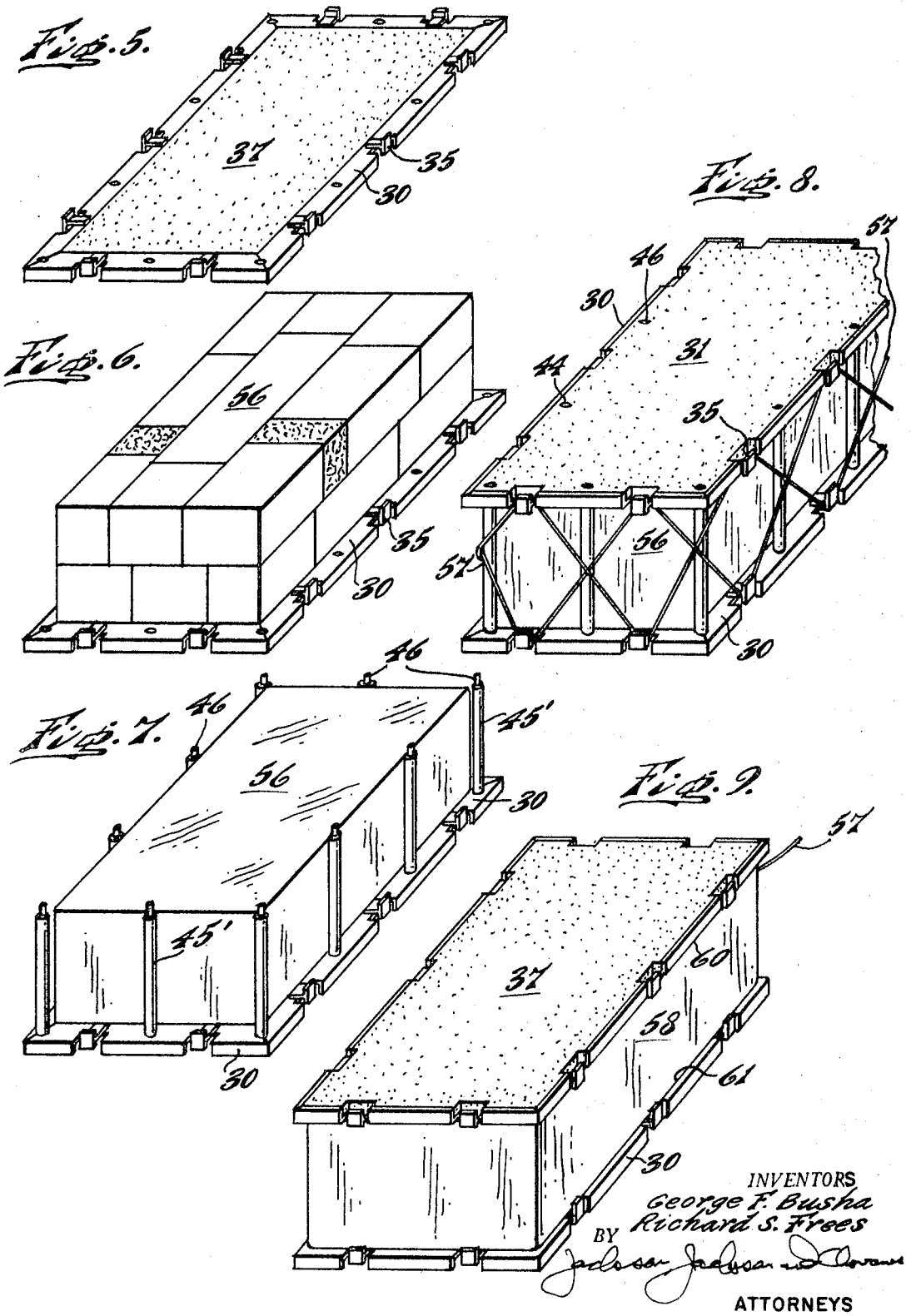

3,456,828
CONTAINER AND METHOD
George F. Busha, Wyncote, and Richard S. Frees, Reading, Pa., assignors to Reading Company, Philadelphia, Pa., a corporation of Pennsylvania
Filed July 11, 1967, Ser. No. 652,505
Int. Cl. B65d 19/02, 17/20
U.S. Cl. 220—1                8 Claims

ABSTRACT OF THE DISCLOSURE

The present invention relates to a pallet consisting of a peripheral frame and a pallet floor of plastic foam bonded to the frame. Columns can be seated in the pallet and a covering of strippable film applied over them. A tear cord can be included to remove the strippable film. The columns can support an upper generally parallel pallet, and both pallets may have cleats around the outside which anchor lacing, the whole being covered by strippable film and the strippable film being torn open by pulling on the lacing to release it from the cleats. By providing simplified upper and lower wall retaining members on the upper and lower pallets, walls can close the sides, and columns can where desired cover the corners. Pallet conveyors made by structural shapes can support the pallets for hoisting and the pallet conveyors will conveniently carry their own casters.

Description of invention

The present invention relates to improved pallets, containers and methods for storage and shipment, particularly suited for aircraft shipment.

A purpose of the invention is to make an inexpensive pallet by providing a peripheral frame, and depositing plastic foam therein which will cement itself to the frame.

A further purpose is to seat columns in a pallet frame and form an enclosure by strippable film around and over the columns and bond it to the pallet frame.

A further purpose is to include a tear cord around the outside of the columns and extend it through the strippable film so that by pulling on the tear cord the package can be opened.

A further purpose is to mount parallel upper and lower pallets with interconnecting columns, and to close the structure by strippable film, desirably running lacing from cleats on the upper and lower pallets under the strippable film, extending the lacing through the strippable film and pulling on the lacing to release it and simultaneously tear the strippable film.

A further purpose is to use improved wall retaining members secured above and below the frames of the upper and lower pallets for supporting walls of a container.

A further purpose is to cover the corners on the container by angle-shaped columns.

A further purpose is to pull the upper and lower pallets toward one another by tension members such as straps.

A further purpose is to provide pallet conveyors which extend under the pallets and desirably anchor thereto by studs or projections extending in openings, the pallet conveyors prefreably also having casters which are removable by pulling out their shanks.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

FIGURE 1 is a perspective showing a partially completed container of the invention.

FIGURE 2 is a top plan view of the pallet shown in FIGURE 1 and the columns.

FIGURE 3 is a section of FIGURE 2 on the line 3—3.

FIGURE 4 is an enlarged section of FIGURE 2 on the line 4—4.

FIGURES 5 to 10 show the preferred embodiment.

FIGURE 5 is a perspective of a pallet according to the invention in position to receive a load to be supported thereon.

FIGURE 6 is a perspective showing the load in position on the pallet of FIGURE 5.

FIGURE 7 is a perspective of the loaded pallet of FIGURE 6, with the coulmns in place.

FIGURE 8 is a fragmentary perspective of the combination shown in FIGURE 7 with an upper pallet in place and lacing uniting cleats on the pallets outside the columns.

FIGURE 9 is a perspective of the combination shown in FIGURE 8 with strippable film applied around the sides over the columns and the lacing, the strippable film being bonded to the top and bottom pallets, and with an end of a cord extending through the strippable film and available to pull and tear the strippable film while releasing the lacing.

FIGURE 10 is a perspective similar to FIGURE 9 showing diagrammatically the result of pulling the lacing and tearing the strippable film to open the package.

FIGURE 11 is a perspective of a modified container of the invention showing rigid side walls.

FIGURE 12 is a fragmentary enlarged sectional perspective of the construction of the pallet and adjoing side wall shown in FIGURE 11.

FIGURE 13 is a diagrammatic perspective of a modified form of the structure of FIGURE 11 provided with columns to cover the corners of the side walls.

FIGURE 14 is a variation of the invention showing the connection of removable casters to a pallet.

FIGURE 15 is a perspective of a pallet conveyor of the invention with removable casters secured thereto.

FIGURE 16 is a reduced scale perspective showing several pallet conveyors in position to support a pallet.

FIGURE 17 is a fragmentary enlarged perspective showing a crane hook attached to one end of one of the pallet conveyors, it being understood that a similar crane hook is attached to each end of each pallet conveyor.

FIGURE 18 is a diagrammatic perspective showing the handling of a container according to the invention.

FIGURE 19 is a diagrammatic side elevation of a variation in the handling of a container according to the invention.

FIGURE 20 is a fragmentary diagrammatic perspective showing a still different manner of handling a container according to the invention.

Describing in illustration but not in limitation and referring to the drawings:

There is a great demand for improved handling of air freight. At present it is generally handled by pallets which are so expensive that they must be deadheaded in the reverse direction.

Furthermore at the present time air freight often has limited protection against the elements during storage at the airport prior to loading, during loading, during unloading and during storage at the receiving airport.

The present invention contemplates improvement in mechanism for handling air freight, although it will be evident that the invention also aids in short term and long term storage of equipment and materials, including warehousing, and in shipment by truck, and rail, either incident to air transportation, or independently of air transportation.

According to the invention an improved pallet has been devised, which is very strong and serviceable, but sufficiently inexpensive so that in many cases it need not be reused.

The pallet of the invention also cooperates in the creation of improved containers which will be weatherproof to an increased degree, and which can be readily opened, for example, by tearing.

The invention also contemplates improved manipulation and handling of pallets and of containers based thereon.

In accordance with the invention the preferred pallet consists of a metallic frame 30 which may, if desired, be made of aluminum, steel, stainless steel or other structural metal, and which conveniently consists of angles 31, best seen in FIGURE 3, which are joined at the corners suitably by mitering at 32, as shown in FIGURE 2, and welding the mitered joints at 33. Any other suitable method of attachment and connection may be used.

The outer periphery of the frame 30 is provided with suitable hardware for attachment to the airplane, and this will vary with different planes, but as an example the frame is cut away at 34 to provide recesses and double cleats 35 of T section as best seen in FIGURE 4 are secured in the recesses as by welding to the top of the angle at 36. It will be understood that if desired the cleats can simply extend farther out from the outer periphery eliminating the recesses. This adds to the strength but does not provide a continuous outer shape in which the cleats are not laterally protruding.

In the preferred embodiment the floor 37 of the pallet consists of a body of plastic foam, preferably a polyester foam such as polyurethane, which is introduced in liquid form and has adhesive properties, bonding to the metallic frame 30 at 38 and 40 as best seen in FIGURES 3 and 4.

The polyurethane or the like is deposited in the space between the horizontal plane of the top of the frame and the horizontal plane of the bottom of the frame so that the top 41 of the floor and the bottom 42 of the floor as best seen in FIGURES 3 and 4 are in the planes of the top and bottom respectively of the frame, it being understood that the cleats extend above the plane of the top of the frame.

The technique for applying and forming the polyurethane foam will permissably follow accepted techniques in the art. For example the plastic composition will be mixed and inserted into what in effect is a mold space within the frame, there being an opening near the upper end to permit release of pressure. The mold space can best be achieved by placing the frame on a horizontal mold bottom, suitably a steel plate as large as the space within the frame, having on top of it a parting sheet such as a sheet of polyester, or a parting paper such as Glidden Company pandura, or painted or coated with a polyurethane parting coating as well known in the art. A hole is desirably cut in the frame near the top to release pressure. The plastic foaming composition can then be poured into the space within the frame on the parting sheet, and a horizontal mold top immediately applied, for example a steel plate having cemented to the lower surface a parting sheet, or parting paper, or having a parting coating thereon. Then the upper and lower plates are clamped together against the frame as by C-clamps. In a very short period of time the foam will form and if adequate plastic foaming material is being introduced will fill the space within the frame and discharge through the upper vent opening. It will be evident of course that the quantity of plastic foaming material introduced in excess of that required to fill the space will determine the density of the foam, since this will regulate the pressure under which the foam sets, since the small vent is not adequate to establish equilibrium conditions immediately.

A desirable minimum density for polyurethane is found to be 250 pounds per cubic foot.

As an alternate to the use of the two plates joined by C-clamps, a press having upper and lower horizontal platens suitably coated with a polyurethane parting coating, as well known in the art, can be used. The foam in most cases need not be reinforced but if desired laminations of a suitable fabric such as glass cloth can be laid in the mold space on top of the foaming material so as to reinforce the plastic. Assuming that the inner surface of the frame is clean, and it should be cleaned after welding, the polyurethane foam will bond firmly to the frame by its adhesive action as it sets.

A platen of the press may if desired be heated.

The mixing of the plastic foaming material will depend upon the desired technique. The ingredients can be mixed by hand, or by a commercial mixer such as Martin Sweets Company Model 30100, the requirement being usually that the mixing be completed within one minute.

The mixture can spread the plastic foaming material in the mold space or it can be poured and distributed by hand.

While various forms of plastic foaming material may be used, we prefer to employ Glidden polyurethane which is a combination of prepolymer Mondur MR, and a catalyst Glidden 299–T–233.

Another source of polyurethane foam is Isofoam PE2 of Isocyanate Products Company, Inc., Wilmington, Del. Part A consists of isocyanate, ether glycol resin, and an emulsifier; and part B consists of ether glycol resin, a catalyst and Freon which asts as a foaming agent.

The polyurethane foam is very strong and effective, one of its advantages being the adhesive bonding to the frame. This is much superior to Styrofoam which is being employed in a cargo pallet for a paracrate in Martin and Radier U.S. Patent 3,093,092, granted June 11, 1963.

The pallet of the invention in a size of 10′ 5″ x 8′, with a polyurethane foam floor ¾ inch thick weights about 75 pounds and is capable of bearing a load of approximately 1500 pounds.

It should be kept in mind that this load bearing capacity can be attained with any one of a variety of tie-down mechanisms connecting it to the airplane, whether by using slotted sides which are engaged by clamps or rails or by employing cleats or anchors or otherwise.

After completion of the pallet, holes 44 as best seen in FIGURE 3, are drilled vertically through the top flange and through the plastic foam to make the pallet capable of receiving columns to be described. It will, however, be understood that the use of columns is optional and that in some cases the loaded pallet will be employed without columns and without making a container.

Columns 45 as best seen in FIGURES 1, 2 and 3 have reduced diameter ends 46 which fit into the openings 44 in the pallet, it being evident that it is optional as will be explained whether the columns have similarly formed upper ends also provided with shoulders 47 or whether the upper ends as shown in FIGURE 1 are straight or rounded at 48.

In the form of package shown in FIGURE 1 the columns, which may be higher toward the middle, if desired, to make the top formation discharge water, are distributed at points located in the corners and around the length and width of the frame so as to surround any load on the pallet (not shown in FIGURE 1).

In order to protect against weather damage to the load on the pallet, after loading the pallet, and applying columns as shown in FIGURE 1, the entire sides and top of the package are covered with strippable film 50 as well known in the art, adhesively bonded to the frame at 51 so as to make a watertight joint by techniques well known in the art.

The strippable film can simply be deposited over a web formed by spraying in the air according to Holst and Hersam U.S. Patent No. 2,459,164, granted Jan. 18, 1949, or a foundation can be used as by stretching scotch tape or by spreading a foundation fabric such as cheesecloth or mosquito netting, cotton mesh or nylon mesh 52 over the sides and top of the container. If desired to make a very strong pack, the foundation fabric may be glass cloth. It is desirable to run around the corners prior to applying the strippable film a tear cord 53 which will be carried out through the strippable film and accessible at the outside if desired and which by pulling will aid in tearing off the strippable film covering as suggested in FIGURE 1.

In FIGURE 1 the application of a strippable film moisture vapor barrier from spray 54 is suggested, it being evident that the film can be polyvinylchloride or a copolymer of polyvinylchloride and the acetate as well known in the art.

It will be evident that the columns depending on the required strength can be of wood, of metal rods or tubing, of nylon, or other suitable material capable of forming the pin ends. The tubing if of metal may be of steel, stainless steel, or aluminum.

In FIGURE 4 a tiedown cord 55 is shown to suggest one means of attachment of the cleats on the pallet to the floor of the freight compartment of the airplane.

It will be evident that if desired the container shown in FIGURE 1 can have a desiccating or dehumidifying agent such as silica gel or activated alumina included inside the container to remove moisture initially present and guard against deterioration of the contents due to moisture leakage. It will also be evident as well known in the art that a dynamic dehumidifying unit may be employed where pipes (not shown) join to the interior of the container in order to dehumidify it during transit or storage.

It is preferable to employ the container shown in FIGURES 5 to 10 rather than the container of FIGURE 1. In this instance the pallet is desirably the same, as shown in FIGURE 5, as the pallet of FIGURES 1 to 4 except that it is considerably more elongated.

FIGURE 6 shows the pallet loaded with boxes to form a load 56 which in later figures is shown as a single box for convenience in illustration.

Columns 45' are distributed in the socket openings 44 around the frame of the pallet as shown in FIGURE 7, the columns having also upstanding pin portions 46 protruding above the load 56.

The next step as shown in FIGURE 8 is the superimpose a second pallet 30 above the first and parallel to it to form a top for the container, the pin portions 46 at the top of the columns entering the socket openings 44 in the top pallet. Thus the columns tend to laterally restrain the load 56 against shifting.

Next as shown in FIGURE 8 lacings 57 are run zig-zag over and under cleats 35 so as to apply tension between the top and bottom pallets and the ends of the lacings are tied, preferably to the cleats at points outside the container which will be formed. As an alternative a knot which can be released by pulling on one free end such as a bow knot can be used inside the container, with the free end preferably accessible on the outside of the strippable film.

Having achieved the lacing, preparations are made to apply strippable film 58 around the sides of the container outside the lacing and outside the columns as shown in FIGURE 9. This can be done with the usual preparations, as by using a self-webbing spray, or applying criss-cross tape or using cheesecloth or mosquito netting as a backing. Seals are made by the strippable film at the top 60 to the upper pallet and at the bottom 61 to the lower pallet as well known in the art. Strippable film can if desired be used to close the ends of openings 44.

In FIGURE 10 the result is shown of pulling on the end of the lacing 57 to tear the strippable film and any foundation webbing in order to permit opening of the lackage. The tear line 60 is not intended to be that which would necessarily be obtained by pulling out the lacing from the cleats but merely suggests diagrammatically opening up by the method of pulling on the end of the lacing, untying any knots if required. It will then be evident that the load can be removed by simply lifting off the upper pallet and removing the columns by lifting them out of the sockets.

Certain principles of the invention can to advantage be applied in other types of package as well known in the art.

FIGURES 11 and 12 show diagrammatically a container 61 having a pallet 30 on the bottom and a pallet 30 on the top connected by rigid side walls 62 to form a box-like container and provided with suitable doors 63 hinged to the walls at 64. The walls are conveniently made of a foam plastic material of a character in itself well known in the art.

It is intended by the present invention to simplify greatly the construction of such a container, eliminating the necessity for the intricate aluminum extrusions which were previously used to retain the side walls.

In accordance with the invention the pallet proper consists of a channel shaped extrusion 65 which is joined by mitering at the ends as well known and which has within it and bonded to it a floor of, for example, polyurethane foam 37.

A relatively simple Z shaped extrusion 66, suitably of aluminum, is provided running around the perimeter of the pallet and consisting of a bottom portion 67 which rests against the upper flat side of the channel 65, an upstanding leg 68 and an outwardly extending horizontal portion 70 which extends flush with the outside perimeter of the pallet frame, and which has two upstanding spaced parallel ribs 71 and 72 which provide a groove 73 for receiving the lower end of the side wall 62. The Z shaped extrusion 66 is joined to the channel 65 either by welding or by fasteners 74 which may be self-tapping screws, bolts entering nuts 75 previously welded in place, or special attachments such as Zeus fasteners. The upper pallet is inverted with respect to the lower pallet so that what is shown in FIGURE 12 as directed upwardly will in the upper pallet be directed downwardly.

It will be evident that the groove 76 commonly used in the art to connect with rails in the airplane is provided by the construction of FIGURE 12.

In order to connect between the upper and lower pallets and place them in tension, anchorages 77 are provided, distributed around both pallets inside the groove 73 and these receive straps 78 which may be of nylon strip, metal strapping, or the like, held together either by buckles or by crimp fittings as well known in the art.

In the form of FIGURE 11 no special provision is shown to protect the corners of the side walls and if desired these can be stapled or otherwise united together.

FIGURE 13 shows diagrammatically a somewhat different construction in which the bottom pallet 30 has angles 80 secured to the ends outside the space to be occupied by the extrusion in FIGURE 12. The angles may be bolted to the bottom or may have welded to them pin portions 46 as shown in FIGURE 3 to enter socket recesses. If bolting is used gusset portions 81 may be provided at the bottom.

In this case the top and bottom pallets inside the space to be occupied by the side walls have anchorages 77' and tension can be applied to the pallets to hold them together as by straps 78 of which only one is shown but of which several will be used.

The sequence of assembly in the form of FIGURE 13 will desirably be placement of the bottom pallet, loading of the pallet, securing the columns 80, at the corners, fitting the side walls in place, placing the top pallet and then placing and applying tension to the strips by entering through the doors.

It will be noted in FIGURE 12 that openings are provided at 44 which are distributed around the pallet to receive the shanks of casters so that the pallet can be rolled on the ground or a floor if desired. FIGURE 14 shows a pallet 30 and in an exploded position a caster 83 having a pivoted roller 84 and a shank 85 for insertion into one of the openings 44 in the rim of the pallet, the shank having spring detents 86 which will anchor the caster in place but permit it to be pulled out when desired.

It is often necessary to provide pallet conveyors which are much more substantial and which can permit hoisting as by a crane.

For this purpose we show in FIGURES 15 to 17 pallet conveyors 87 consisting of I beam sections, which are provided with removable casters 83 of the character shown in FIGURE 14. Pins 88 protrude upward in position to enter the openings 44 distributed around the pallet. It will be evident that to avoid unintended detachment, the pallet conveyors will desirably be secured to the pallets as by chains or ropes not shown.

It will be convenient to use three pallet conveyors under the pallet as suggested in FIGURE 16. This figure also suggests that the pallet conveyors can be used like skids without employing casters.

Pallet conveyors 87 in either ends have hook connecting openings 90 for connection with hooks 91 to a crane whose chain is shown at 92.

It will be evident that the pallets and containers of the invention lend themselves to handling in a variety of different ways.

In FIGURE 18 a complete container with pallet according to the invention is shown at 94 being manipulated on rollers 95 and about to be manipulated by a ball bed 96.

In FIGURE 19 a cart 97 is shown having a roller bed 98 adapted to receive the containers of the invention.

FIGURE 20 illustrates diagrammatically a car 100 which may be a roller car or a flat bed truck or trailer which has a bed 101 supporting a container 94 of the invention which has been loaded thereon by a suitable vehicle such as a piggy packer 102 having a manipulator arm 103 (Railway Age, June 26, 1967).

Having thus described our invention what we claim as new and desire to secure by Letters Patent is:

1. A shipping pallet comprising a peripheral frame having a top in a plane and a bottom in a plane, having vertical openings distributed around the frame, a pallet floor of plastic foam bonded to the frame having a top surface substantially in the plane of the top of the frame and a bottom surface substantially in the plane of the bottom of the frame, columns seated in the openings and extending upward from the pallet and a second pallet similar unto the first pallet supported by the columns in generally parallel spaced relation to the first pallet.

2. A container of claim 1, in which each of the pallets has fastening means distributed around the outside, and lacing extending between the fastening means of the lower pallet and fastening means of the upper pallet outside the columns and holding the two pallets together.

3. A container of the claim 2, in combination with a layer of strippable film surrounding the lacing, bonding to the lower pallet at least, and joining together the upper and lower pallets to form an enclosure.

4. A container of claim 3, in which the end of the lacing protrudes through the strippable film, the lacing serving to tear the strippable film for opening.

5. A container of claim 4, having distributed around the outside fastened to the frame double cleats which engage the lacing on the top and also on the bottom.

6. In a container, a lower pallet having a frame and a floor joined to the frame, a lower wall retaining member secured to the frame having upwardly directed U-shaped grooves, columns secured to the lower pallet and extending upward in generally parallel relation, an upper pallet secured on the top of the columns having a frame and a floor united to the frame, an upper wall retaining member secured to the frame of the upper pallet and having downwardly directed U-shaped grooves in line with the grooves of the lower wall retaining member, and walls secured in the grooves of the upper and lower members and closing the space between the pallets.

7. A container of claim 6, in which the walls meet at the corners, and columns are located at the corners and are angle shaped, covering the corner intersections of the walls.

8. A container of claim 7, in combination with tension members securing together the upper and lower wall retaining members.

References Cited

UNITED STATES PATENTS

| 2,556,418 | 6/1951 | Del Mar | 200—1.5 |
| 2,572,348 | 10/1951 | Johnson | 108—51 |
| 3,093,092 | 6/1963 | Martin et al. | |
| 3,173,539 | 3/1965 | Looker | 206—65 |

JAMES B. MARBERT, Primary Examiner